US008356059B2

(12) United States Patent
Wiljanen et al.

(10) Patent No.: US 8,356,059 B2
(45) Date of Patent: Jan. 15, 2013

(54) METHOD AND SYSTEM FOR RAPID AND COST-EFFECTIVE DEVELOPMENT OF USER GENERATED CONTENT

(75) Inventors: Joel E. Wiljanen, Sammamish, WA (US); Raymond Arifianto, Bothell, WA (US); Stephen P. Dolan, Redmond, WA (US); Hiroki Kobayashi, Osaka (JP)

(73) Assignee: Microsoft Corporation, Redmond, WA (US)

( * ) Notice: Subject to any disclaimer, the term of this patent is extended or adjusted under 35 U.S.C. 154(b) by 1045 days.

(21) Appl. No.: 12/271,034

(22) Filed: Nov. 14, 2008

(65) Prior Publication Data

US 2010/0125613 A1    May 20, 2010

(51) Int. Cl.
*G06F 12/00* (2006.01)
*G06F 7/30* (2006.01)
*G06F 15/16* (2006.01)
*G06F 21/00* (2006.01)
*G06F 3/00* (2006.01)
*G06F 13/00* (2006.01)

(52) U.S. Cl. ............ 707/803; 707/999.003; 707/999.01; 707/999.1; 707/999.102; 709/217; 705/51; 725/52

(58) Field of Classification Search .................. None
See application file for complete search history.

(56) References Cited

U.S. PATENT DOCUMENTS

| 2003/0101190 | A1* | 5/2003 | Horvitz et al. ............... 707/100 |
| 2004/0019658 | A1* | 1/2004 | Plastina et al. ............... 709/217 |
| 2004/0167900 | A1* | 8/2004 | Owen et al. .................. 707/10 |
| 2004/0167920 | A1* | 8/2004 | Owen et al. .................. 707/102 |
| 2004/0187111 | A1* | 9/2004 | Eakin ........................... 718/100 |
| 2007/0060380 | A1 | 3/2007 | McMonigle et al. |
| 2007/0156726 | A1* | 7/2007 | Levy ............................. 707/100 |
| 2007/0168309 | A1 | 7/2007 | Tzruya et al. |
| 2007/0180470 | A1* | 8/2007 | Gill et al. ....................... 725/52 |
| 2007/0192253 | A1* | 8/2007 | Gill et al. ....................... 705/51 |
| 2007/0192352 | A1* | 8/2007 | Levy ............................. 707/102 |
| 2007/0208711 | A1* | 9/2007 | Rhoads et al. .................. 707/3 |
| 2007/0255717 | A1* | 11/2007 | Baikov et al. .................. 707/10 |
| 2007/0255718 | A1* | 11/2007 | Baikov et al. .................. 707/10 |
| 2008/0133569 | A1* | 6/2008 | Vu et al. ......................... 707/102 |
| 2008/0168067 | A1* | 7/2008 | Ruiz-Velasco et al. ......... 707/10 |
| 2009/0007188 | A1* | 1/2009 | Omernick ....................... 725/62 |
| 2009/0037514 | A1* | 2/2009 | Lankford et al. ............. 709/201 |
| 2009/0300139 | A1* | 12/2009 | Shoemaker et al. .......... 709/217 |
| 2010/0058169 | A1* | 3/2010 | Demant et al. ................. 715/234 |

OTHER PUBLICATIONS

K. Selcuk et al., Discovering Mappings in Hierarchical Data from Multiple Sources using the Inherent Structure, 2008, [Retrieved on Aug. 22, 2012]. Retrieved from the internet: <URL: http://scholar.google.com/scholar?start=10&q=%22content+schema%22+%22media+content%22+metadata&hl=en&as_sdt=1,47> 22 Pages (1-22).*

(Continued)

*Primary Examiner* — Don Wong
*Assistant Examiner* — Anibal Rivera
(74) *Attorney, Agent, or Firm* — Woodcock Washburn LLP

(57) ABSTRACT

An express content metadata system ("ECM") may provide functionality for uploading, querying and downloading game content without heavy coding requirements on the part of the developers. The ECM may provide fast indexing, searching and data retrieval of content. The ECM may manage evolving changes to content definitions by providing flexible and efficient versioning control over content definitions that allows multiple versions of game content to coexist and be independently searchable.

17 Claims, 14 Drawing Sheets

OTHER PUBLICATIONS

Carney, K., "The Ins and Outs of User-Generated Game Content", http://www.clickz.com/showPage.html?page=3628747, Mar. 17, 2008, 6 pages, Downloaded from Internet Sep. 23, 2008.

Simpsons Solicitors, User Generated Games—Microsoft's Latest Xbox 360 Game Development Strategy, http://www.simpsons.com.au/news/?p=18, Posted on Aug. 28, 2008, 1 page.

The Evolution of Quasr's Design, Hacthlings Games, http://hatchlings.wordpress.com/2007/03/25/the-evolution-of-quasrs-design, Downloaded from Internet Sep. 23, 2008, 12 pages.

Now User-Generated Content on Xbox Live, Techtree News Staff, Jul. 23, 2008, www.techtree.com, 3 pages.

LittleBigPlanet, http://www.us.playstation.com/PS3/Games?LittleBigPlanet, Downloaded from Internet Sep. 23, 2008, 3 pages.

Creating Game Content: User-Generated Computer Game Modifications, http://www.allacademic.com, Downloaded from Internet Sep. 23, 2008, 2 pages.

* cited by examiner

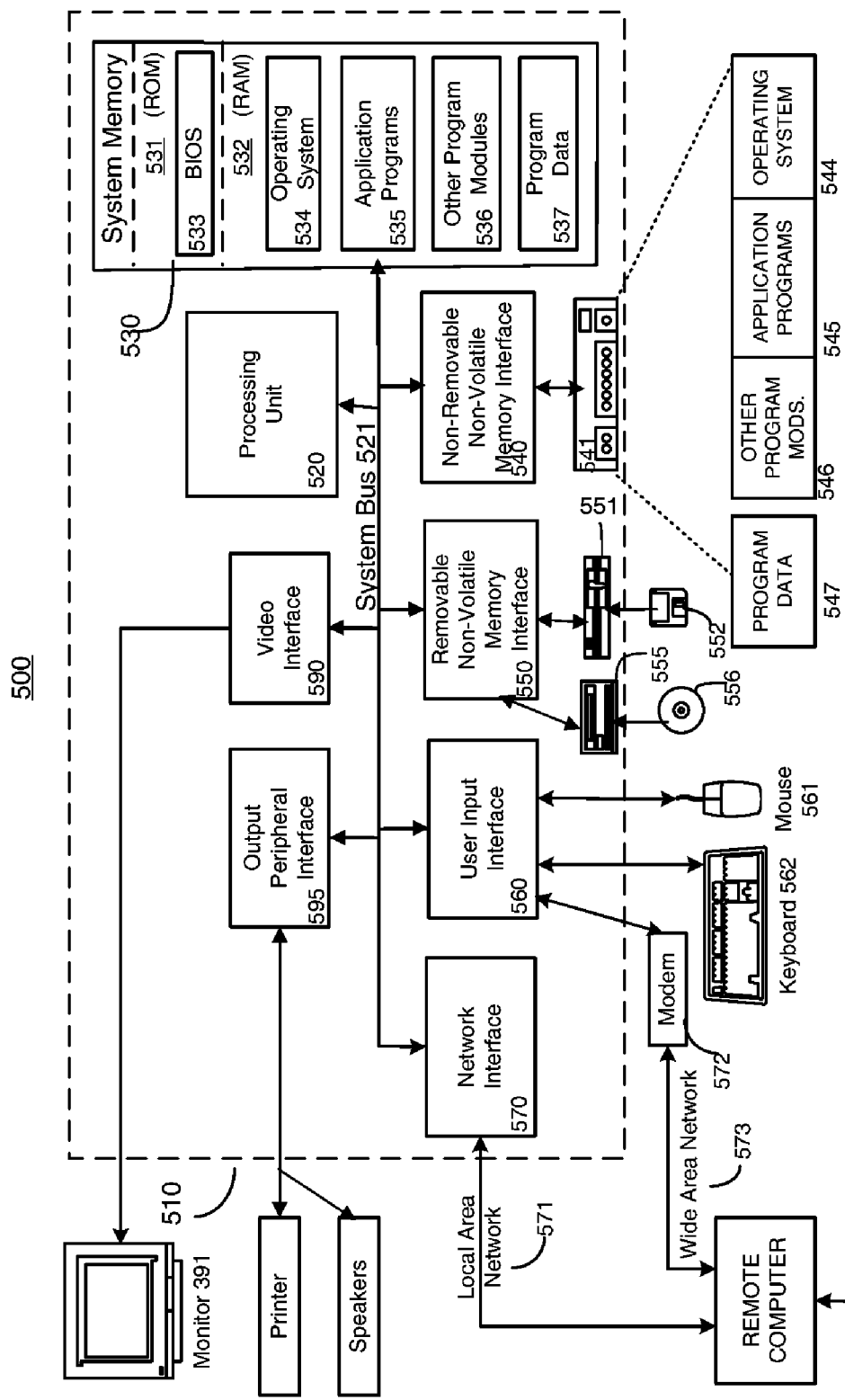

METHOD AND SYSTEM FOR RAPID AND COST-EFFECTIVE DEVELOPMENT OF USER GENERATED CONTENT

BACKGROUND

Entertainment and video game software applications have evolved in ways unforeseen by early pioneers in the field. While early video games typically provided static content including graphics and sound, modern video games may be dynamically configured to include new content only limited by the abilities of game and content developers. In addition, new content may be generated not only by professional game developers but also game enthusiasts who wish to share their content with other gamers. This provides a very rich creative environment for game development.

Thus, when a user purchases a game, the user typically relies on the assumption that new content will become available over time for a title. This scenario is mutually beneficial for the user and the game developers. For the user it insures that the lifetime of the game will be virtually unlimited as new content will become available over time. For game developers, a single title provides a sustained revenue stream if users are willing to pay for new content created for the title. Thus, the ability to provide dynamic content over time to users makes users more willing to buy and thus developers more invested in developing complex and often expensive titles.

Nonetheless, dynamic content availability creates a number of technical challenges from a development and information technology perspective. As content may be created dynamically, a game is always under development, multiple schema versions of content may coexist at a single point in time. Typically a content server is configured to allow a game development team to upload, modify and download game content during the development phase.

This scenario raises a number of challenges for efficient game development. With known methods, game development of a new content element or feature may be very slow and require the developer to generate significant amounts of code unrelated to the substantive game feature they are developing. In addition, traditional methods do not allow for schema versioning. Thus, an alternative method is required.

SUMMARY

An express content metadata system ("ECM") may provide developers functionality for uploading, querying and downloading game content without heavy coding requirements on the part of the developers. The ECM may provide fast indexing, searching and data retrieval of content. The ECM may manage evolving changes to content definitions by providing flexible and efficient versioning control over content definitions that allows multiple versions of game content to coexist and be independently searchable.

According to one embodiment, a rapid design paradigm for iteration and deployment of new content is described. The process commences with a developer conceiving a new feature or content element for a game. The developer may then generate an XML ("Extensible Markup Language") schema pertaining to that feature describing a model for the content element, which serves as metadata for the content element. The developer may then upload the content schema, which is validated. Upon validation, a code generation process may generate Wrapper APIs with "friendly" API methods to invoke various methods relating to the content element. The developer may then download the generated wrapper source code, integrate the wrapper code and libraries into their game source code and finally build and run their game to test out the features.

BRIEF DESCRIPTION OF THE DRAWINGS

FIG. 5 shows an exemplary computing environment in which aspects of the example embodiments may be implemented.

DETAILED DESCRIPTION OF ILLUSTRATIVE EMBODIMENTS

Figure 1A:
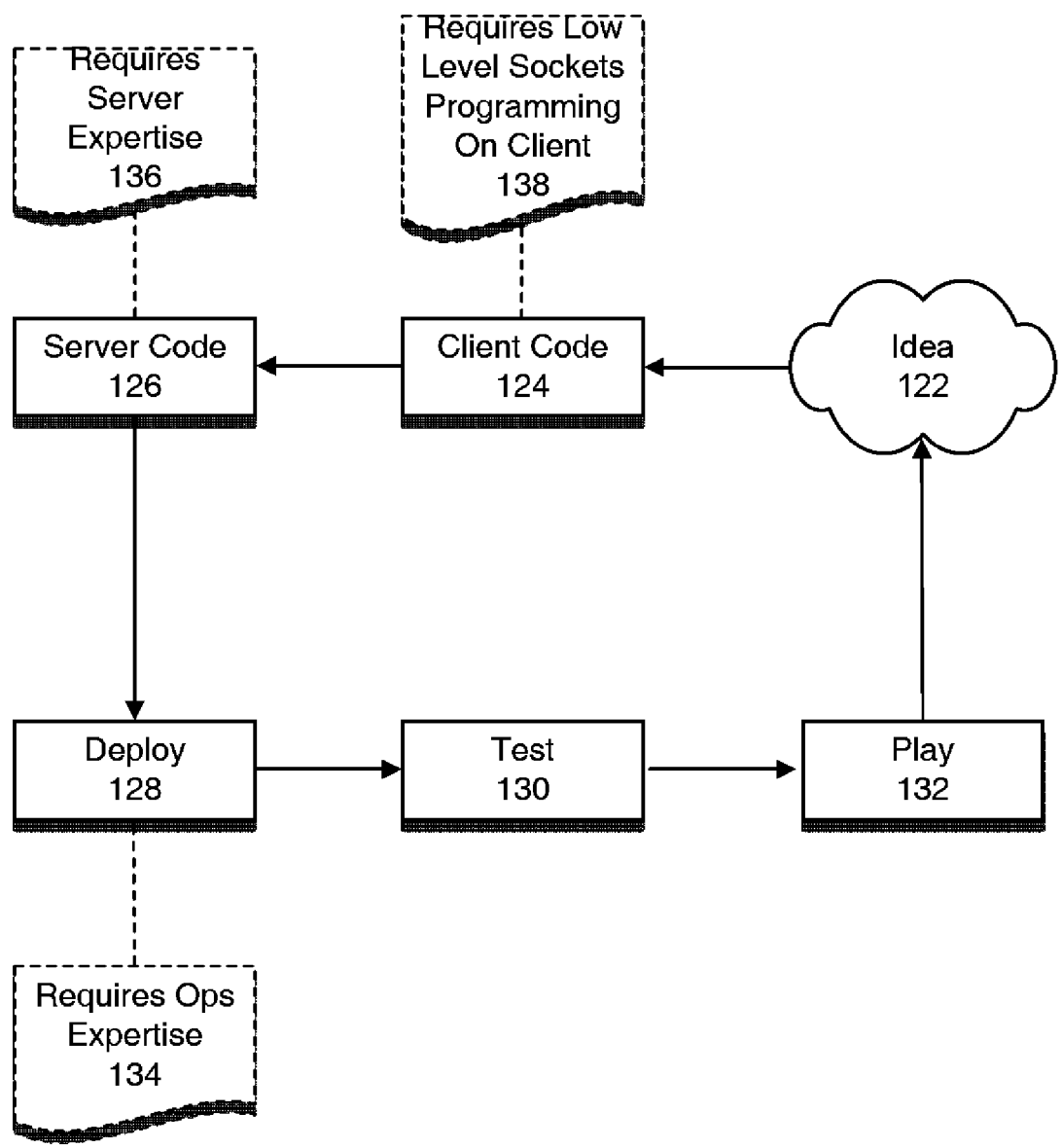
FIG. 1A depicts an exemplary game development paradigm.

FIG. 1A depicts a game development paradigm. Upon conception of idea 122, a game developer (not shown in FIG. 1A) is typically required to generate client code requiring low level sockets programming on a client 138 and server code 126 on a server requiring server expertise 136. The client and server code must then be deployed 128 requiring administration and operations expertise 134. Only after all of these steps have been completed with the associated client code generation 124, server code generation 126 and deployment 128, may testing 130 of the idea begin. Upon completion of testing 130, the idea may be implemented in actual game play 132.

Figure 1B:
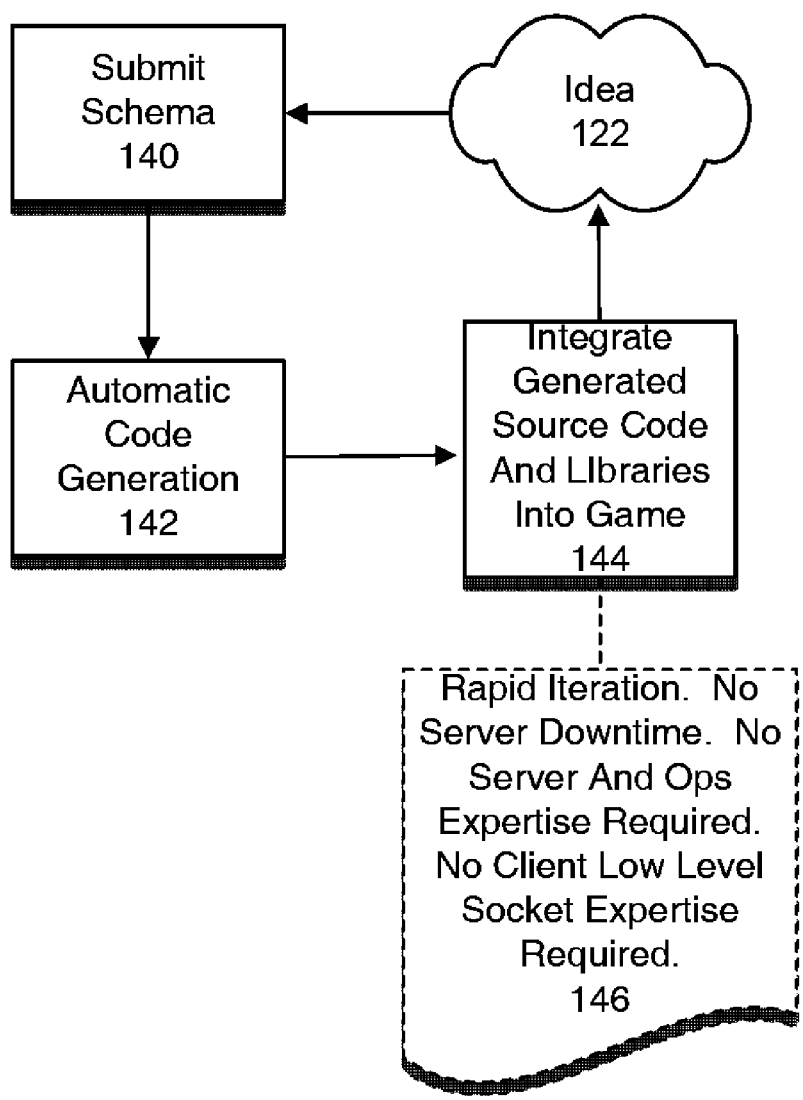
FIG. 1B depicts an exemplary game development paradigm to which the present application may be directed.

FIG. 1B depicts an exemplary game development paradigm to which the present application may be directed. An idea for new game content or a feature is conceived for a particular game title in 122. In 140 a developer or game designer submits a schema describing the new content conceived in 122. The structure and function of the schema will become evident as the method and system is further described. In general, the schema defines a particular title's models, which are descriptions of user-generated content. The schema may also describe possible updates to existing model records already existing in the database and queries that may be performed against the models. According to one embodiment, the schema may be coded in XML ("Extensible Markup Language"). In 142 based upon the submitted schema in 140, an automatic code generation process is performed to generate code relating to the schema. The developer may then be provided with access to the generated code. In 144 the developer may integrate the generated code and any associated libraries into a game under development. As noted in 146, the described paradigm provides for rapid iteration with no server downtime, no server and operations expertise require and no low level client socket experience required.

Figure 1C:
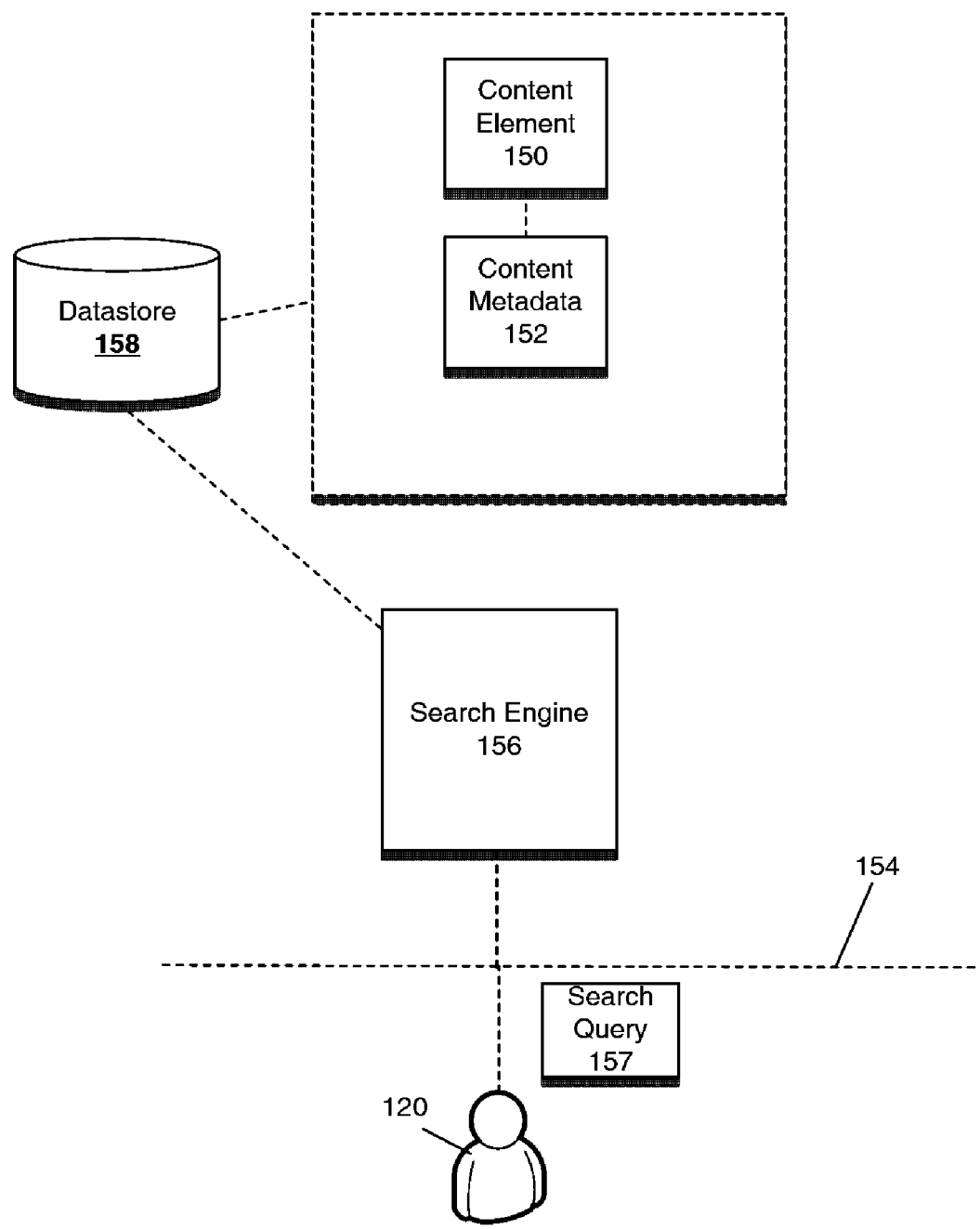
FIG. 1C depicts an exemplary search environment for retrieving content.

FIG. 1C depicts an exemplary search environment for retrieving content. Content may be content generated for video game titles. Datastore 158 stores any number of content elements 150 and associated content metadata 152. Content metadata 152 may comprise any descriptive or definitional information regarding the characteristics, context, quality and/or condition of content element 150. Typically content metadata 152 may provide a format to allow user 102 to search for content element 150 in a natural way utilizing descriptions and concepts natural to human interaction. Although FIG. 1C depicts a single content element 150 and associated metadata 152, it is understood that content datastore 158 may store a plurality of digital content elements and their associated metadata in order to allow users to search and retrieve particular content elements.

In order to search for digital content element 150, user 120 may provide a search query 157 to search engine 156 via search engine interface 154, which may be a Web interface. Search engine 156 may perform a search against the entirety of content metadata in datastore 158 to retrieve all content items satisfying the search query. The user may then be presented with options for performing interactions with the retrieved content items such as downloading, updating, etc.

Figure 2A:
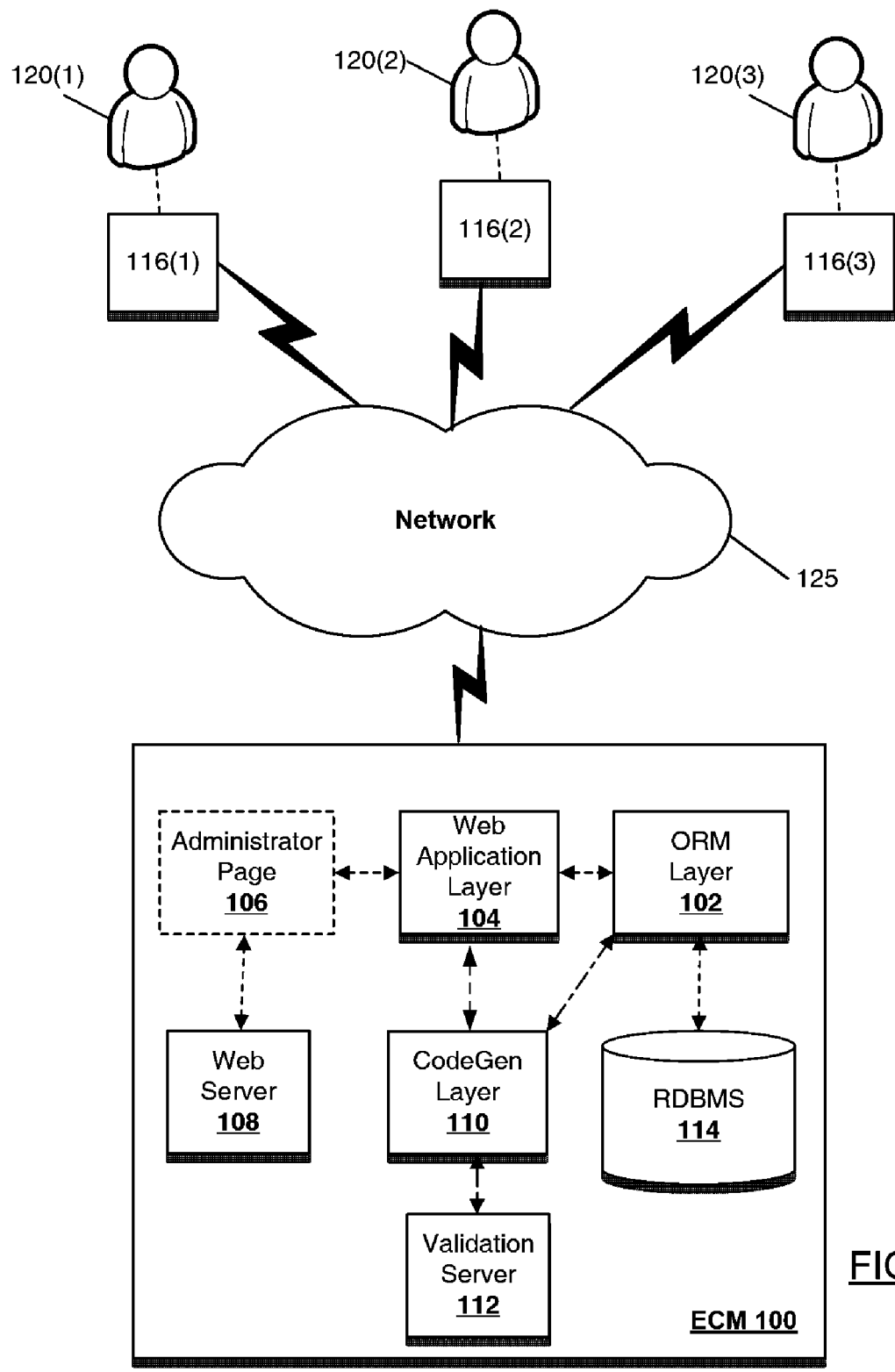
FIG. 2A shows an exemplary ECM deployed in a network environment.

FIG. 2A shows an exemplary ECM deployed in a network environment. Game developers 120(1)-120(3) may connect with ECM 100 via respective development devices 116(1)-116(3) and network 125. Game developers 120(1)-120(3) may be part of a common development team developing content for a specific title. Network 125 may be any type of network such as a LAN ("Local Area Network"), WAN ("Wide Area Network"), wireless network or the Internet. Development devices 116(1)-116(3) may be personal computers, computer workstations or any electronic device which a game developer (e.g., 120(1)-120(3)) may use to develop computer games or titles. Typically, development devices 116(1)-116(3) may be coupled to network 125 and may be equipped with communication capabilities in order to send and receive information via network 125.

Development devices 116(1)-116(3) may utilize any type of communication protocol in order to communicate with ECM 100 via network 125. Development devices 116(1)-116(3) and ECM 100 may be coupled to network 125 and may utilize any type of communications protocol and transport protocol for the transmission and exchange of information. For example, in the case where network 125 is the Internet, development devices 116(1)-116(3) and ECM 100 may communicate using the TCP/IP protocols. As described below, ECM 100 may provide a Web server and thus development devices 116(1)-116(3) may communicate with ECM 100 via HTTP ("Hypertext Transport Protocol").

ECM 100 may comprise ORM ("Object Relational Mapping") layer 102, web application layer 104, administrator page 106, web server 108, CodeGen layer 110, validation server 112 and RDBMS 114 ("Relational Database Management System").

RDBMS 114 stores data relating to generated content using a relational model. According to one embodiment RDBMS 114 stores data utilizing a plurality of tables comprising database schema such that data may be stored in a normalized fashion. According to one embodiment the schema defined for RDBMS 114 is static, i.e., fixed.

Although RDBMS schema 114 may be fixed, users 102 of ECM 100 typically require defining and interacting with objects in a dynamic and flexible manner. ORM layer 102 provides a mapping between objects exposed to users and data stored in RDBMS 114, which are scalar values. According to one embodiment, ORM layer 102 defines an individual content metadata unit referred to herein as a SearchableItem. ORM layer 102 further comprises a schema component The structure of ORM layer 102 and the content metadata unit SearchableItem will be described in detail below.

Web application layer 104 provides various methods for interacting with ECM. According to one exemplary embodiment web application layer 104 provides a create method that allows a client to upload digital content along with its metadata in a single call and create a metadata object (referred to herein as a SearchableItem Object and described below), an update method that enables a client to modify an existing record when its data changes on the client, a search method that enables a client to query the ECM for content based on specific search criteria and a get method that retrieves all metadata for a single content item.

CodeGen layer 110 receives a content schema definition (not shown in FIG. 2A), which among other things defines comprises a well-defined a structured definition of a title's content along with query definitions on how to update and/or search for that content as well as what data is relevant to be returned with each query. The CodeGen layer 110 may analyze the content schema definition and generate custom data structures based upon the names and data types for that definition. According to one embodiment, CodeGen layer 110 may analyze customer queries and create local in-title APIs mapped and named after customer-defined query names that wrap actual calls to lower level web methods that may not be as user-friendly. This allows a game developer to write a schema that results in friendly looking APIs that map directly to in-game data and only that data. For example, a user might be able to write an API entitled "CreateCar" as opposed to calling a more cumbersome and generic API where many arguments will not apply to their specific needs. According to one embodiment, as described in more detail below, a more generic API that may ultimately be called.

Administrator page 106 may provide an interface for users 120(1)-120(3) to interact with ECM 100. According to one embodiment administrator page 106 may be a HTML ("Hypertext Markup Language") page served by web server 108 upon request of a specific URL ("Uniform Resource Locator"). Thus, users 120(1)-120(3) may interact with ECM via a web browser (not shown in FIG. 1C), which display administrator page 106 upon request of a specific URL associated with ECM 100. Administrator page 106 may allow a development team to configure a particular content server configuration based upon content they are developing.

Among other functionality, administrator page 106 may allow users 120(1)-120(3) to upload a content schema definition (described in detail below), which may be a schema written in an XML format that defines content and how search for the content based upon particular object definitions. Upon receipt of a content schema definition, the administrator page may call CodeGen layer 110, which may then generate header (.h) and body (.cpp) files that may wrap calls to an underlying API.

Validation server 112 may perform various validation routines of data uploaded by users 102(1)-102(3) to ECM 100.

Figure 2B:
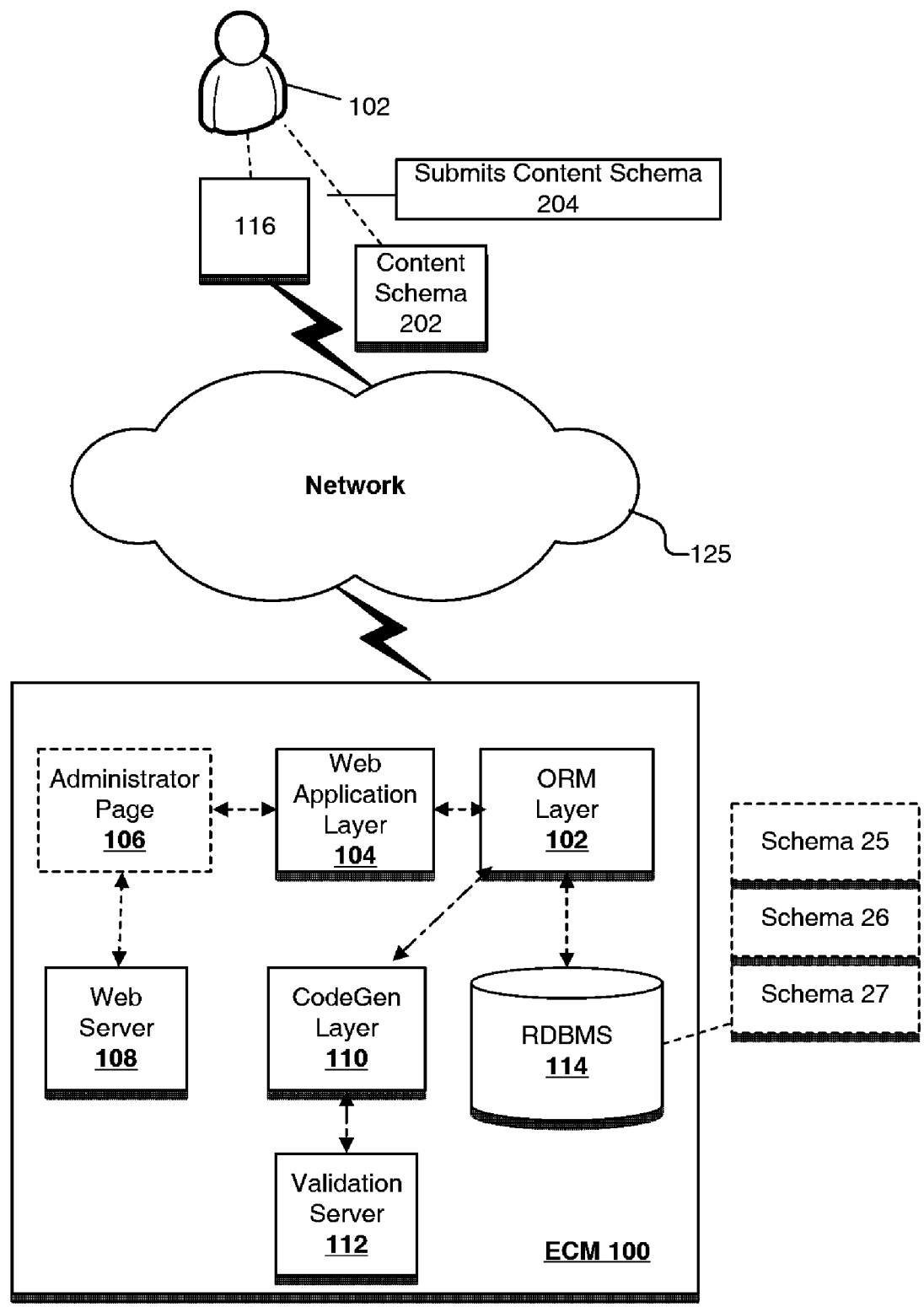
FIG. 2B depicts an exemplary use case of an ECM with respect to submission of a content schema according to one embodiment.

FIG. 2B depicts an exemplary use case of an ECM with respect to submission of a content schema according to one embodiment. In act 204 a user 102 using an associated development device 116 may submit a content schema 202 to ECM 100 via network 125 and administrator page 106. The submitted content schema 202 may be received at ECM 100 via administrator page 106. Upon receipt of content schema 202 by ECM 100, the content schema may be validated by validation server 112 via Web server 108.

According to one embodiment, administrator page 106 may parse content schema 202 and configure various tables in RDBMS 114 that control how content schema 202 maps to a fixed schema in RDBMS 114.

Upon validation of content schema 202, the content schema 202 may be registered and stored in RDBMS 114. RDBMS may store mutltiple versions of a schema for versioning purposes. Thus, as shown in FIG. 2B, for example, RDBMS may store schema 25, schema 26 and schema 27 all pertaining to different versions of a content element. Administrator page 106 may then call CodeGen layer 110 using the validated content schema to generate wrapper code based upon content schema 202. The structure and functions of CodeGen layer 110 in generating wrapper code based upon a content schema 202 is described in detail below.

Figure 2C:
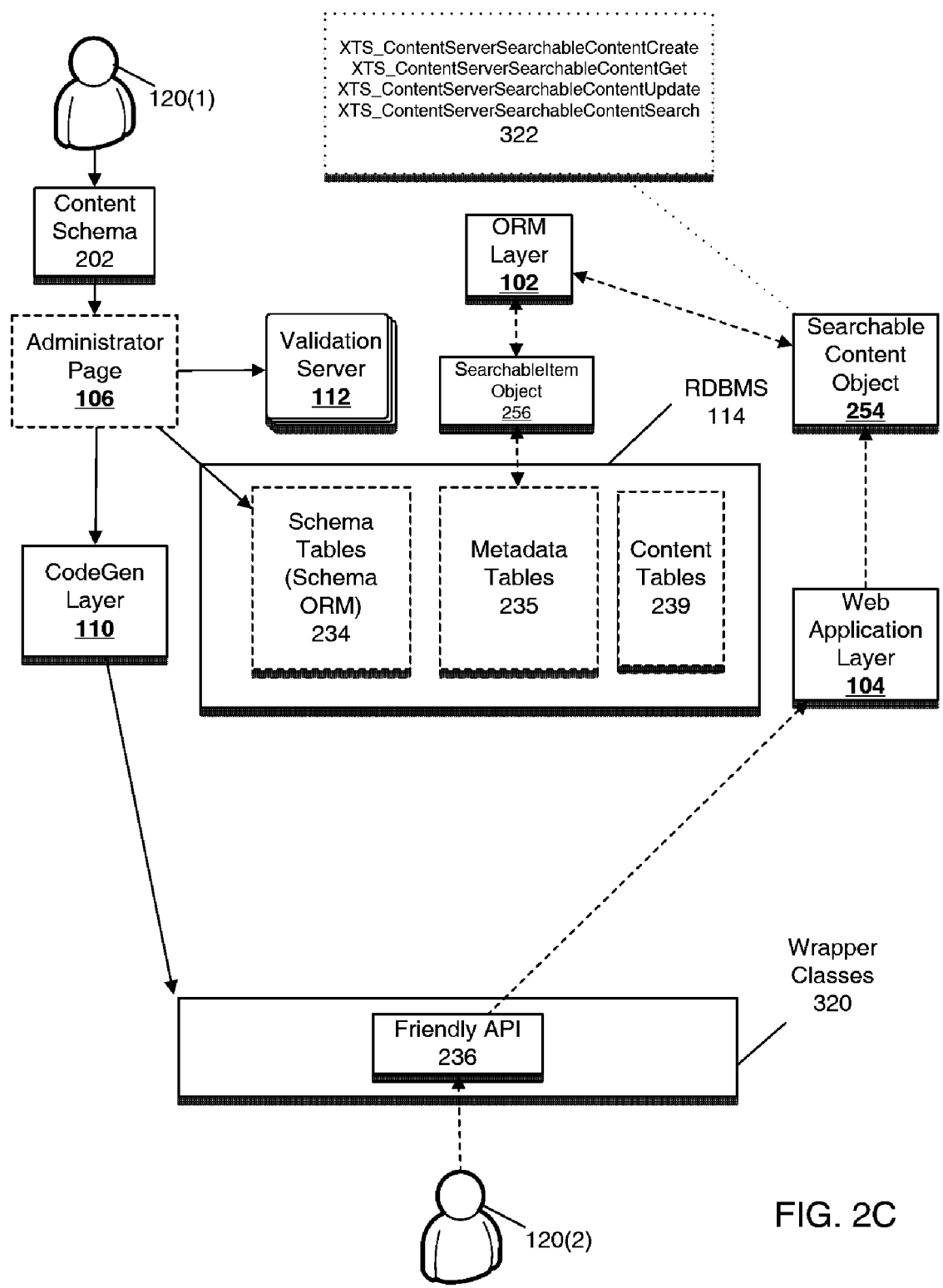
FIG. 2C further illustrates an operation of an ECM according to one embodiment.

FIG. 2C further illustrates an operation of an ECM according to one embodiment. The solid arrows shown in FIG. 2C indicate processes occurring as a result of user 120(1) uploading content schema 202 to ECM 100 (not shown in FIG. 2C). User 120(1) may upload content schema 202 to ECM 100 via administrator page 106. As described in detail below, content schema 202 may comprise information relating to models. As used herein, models may comprise at least one field, which defines a generic data element for a content element; updates, which represent how to update previously defined models; and queries, which define what type of search queries may be performed against models. Administrator page 106 may pass received content schema 202 to validation server 112 for validation. If received content schema 202 is validated, administrator page 106 may pass content schema to CodeGen layer 110. CodeGen layer upon receiving content schema 202 may generate customized Wrapper APIs 320, which may contain one or more friendly APIs 236. Friendly APIs utilize method names that map directly to names of content elements defined by users 120. For example, if a content element were a car, a friendly API might be "CreateCar", rather than a less intuitive method name that may be required for an underlying API.

In addition, upon uploading content schema 202, administrator page 106 may populate schema tables 234 based upon received content schema. Schema tables 234 described in more detail below store information regarding information defined in content schema 220 such as the fields, updates and queries. The structure of an exemplary content schema 220 as well as schema tables is described in detail below. Content tables 239 may store actual content element data according to one embodiment.

The dashed arrows in FIG. 2C illustrate processes occurring due to user 120(2) invoking a method in friendly API 236. As noted previously, friendly API may have been generated automatically by CodeGen layer 110. Upon invocation of a method in friendly API 236, a name resolution process is performed (the name resolution process is described below). The name resolution process maps from a method name in friendly API 236 to corresponding information stored in schema tables 234. That is, the call to a friendly API 236 may map to various rows in schema tables (Schema ORM) 234. This mapping is transparent to user 120(2).

The method invocation via friendly API 236 may be made via web application layer 104. As noted previously, web application layer 104 may support methods create, get, update and search methods (described in detail below). Friendly API calls on the client may be mapped to a fixed API call such as XTS_ContentServerSearchableContent (still on the client), which in turn use may invoke a web method in application layer 104 that knows how to map that data to a SearchableContent object on the server. The structure of a SearchableContent object 254 is described in detail below. Calls to the web application layer 104 result in a SearchableContent object 254 that may invoke ORM layer 102, which negotiates between SearchableItem Object 256 and underlying metadata stored in RDBMS 114 in metadata tables.

Figure 2D:
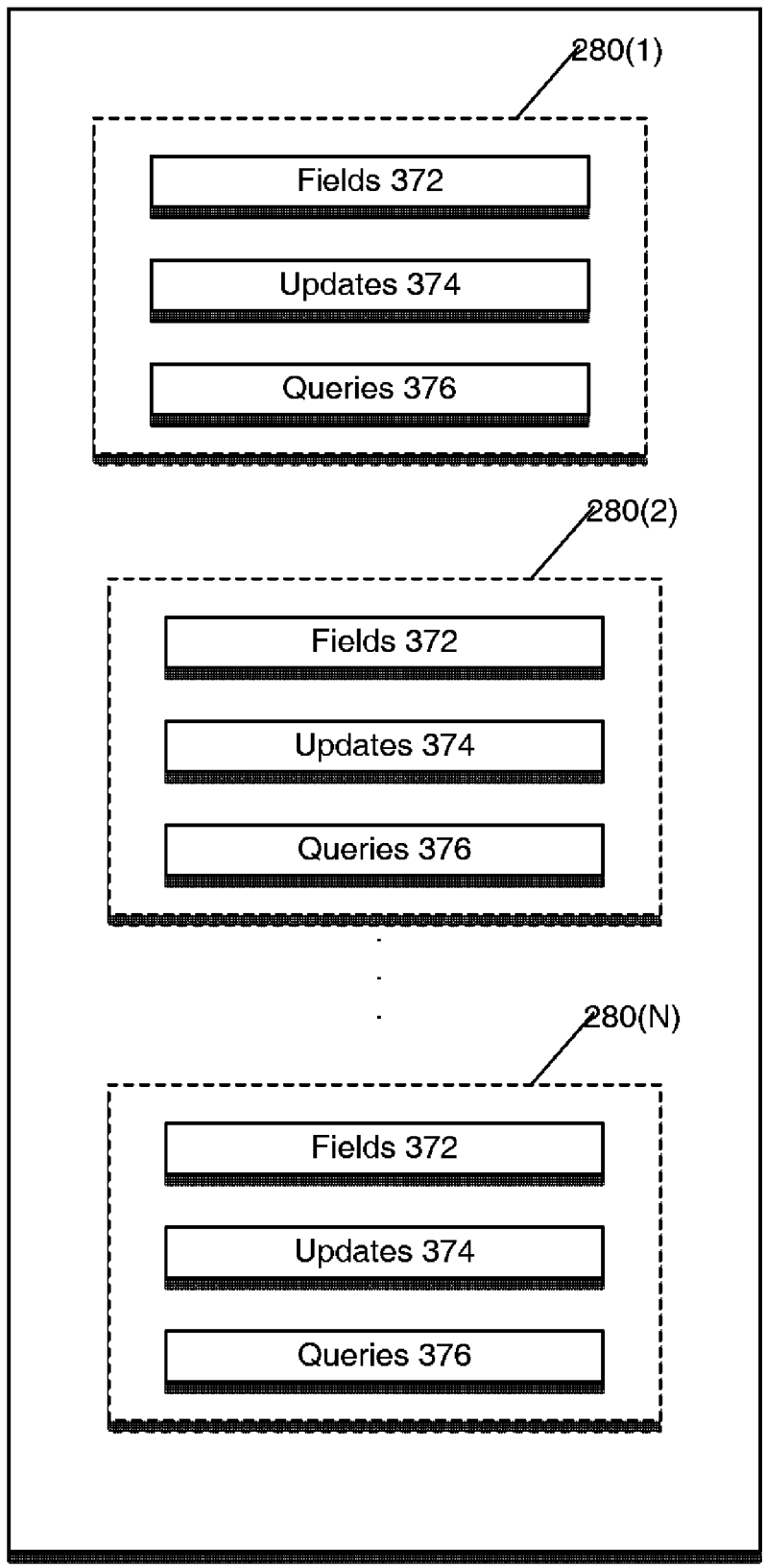
FIG. 2D shows an exemplary structure of a content schema according to one embodiment.

FIG. 2D shows an exemplary structure of a content schema according to one embodiment. According to one embodiment, content schema comprises at least one model 280(1)-280(N). Each model 280(1)-280(N) comprises fields block 372, updates block 374 and queries block 376. According to one embodiment, there is a 1-1 mapping between models and content elements. For example, a game may specify Photo, Blueprint and Reply model types. Fields block 372 may define fields required for a particular model. According to one embodiment, each field is a primitive type, which may be for example, integer values, floating point values, unsigned long values, string values, and date/time values. In addition, a non-searchable "Blob" field may also be defined, which may store preview data. For instance, a model might have 15 integer fields but no ulongs and a handful of strings. According to one embodiment a maximum number of searchable fields may be defined for a given model.

Updates block 374 describes types of targeted updates users may make to existing model records already existing in schema tables of RDBMS 114. Queries block 376 describes types of search queries users may perform against the models. According to one embodiment content schema 220 is an XML file. As previously discussed, administrator page 106 allows for the uploading of a content schema 220.

A exemplary portion of a content schema 220 coded in XML is shown below:

```
<contentserver>
    <models>
        <model name="Car">
            <fields>
                <field name="Color" type="int" />
                <field name="Price" type="int" />
                <field name="DriverXuid" type="ulong" />
                <field name="Make" type="string" />
                <field name="Model" type="string" />
                <field name="Thumbnail" type="blob" />
                <field name="Logo" type="blob" />
                <field name="Sound" type="blob" />
            </fields>
            <updates>
                <update name="ColorAndPrice">
                    <field name="Color" />
                    <field name="Price" />
                </update>
                <update name="MyThumbnail">
                    <field name="Thumbnail" />
                </update>
            </updates>
                    <queries>...
        </model>
    </models>...
```

This exemplary content schema 220 comprises a model for a content element called "Car" with metadata fields "Color", "Price", "DriverXuid", "Make", "Model", "Thumbnail", "Logo" and "Sound". These fields are respectively "int", "int", "ulong", "string", "string", "blob" and "blob" types.

Figure 3A:
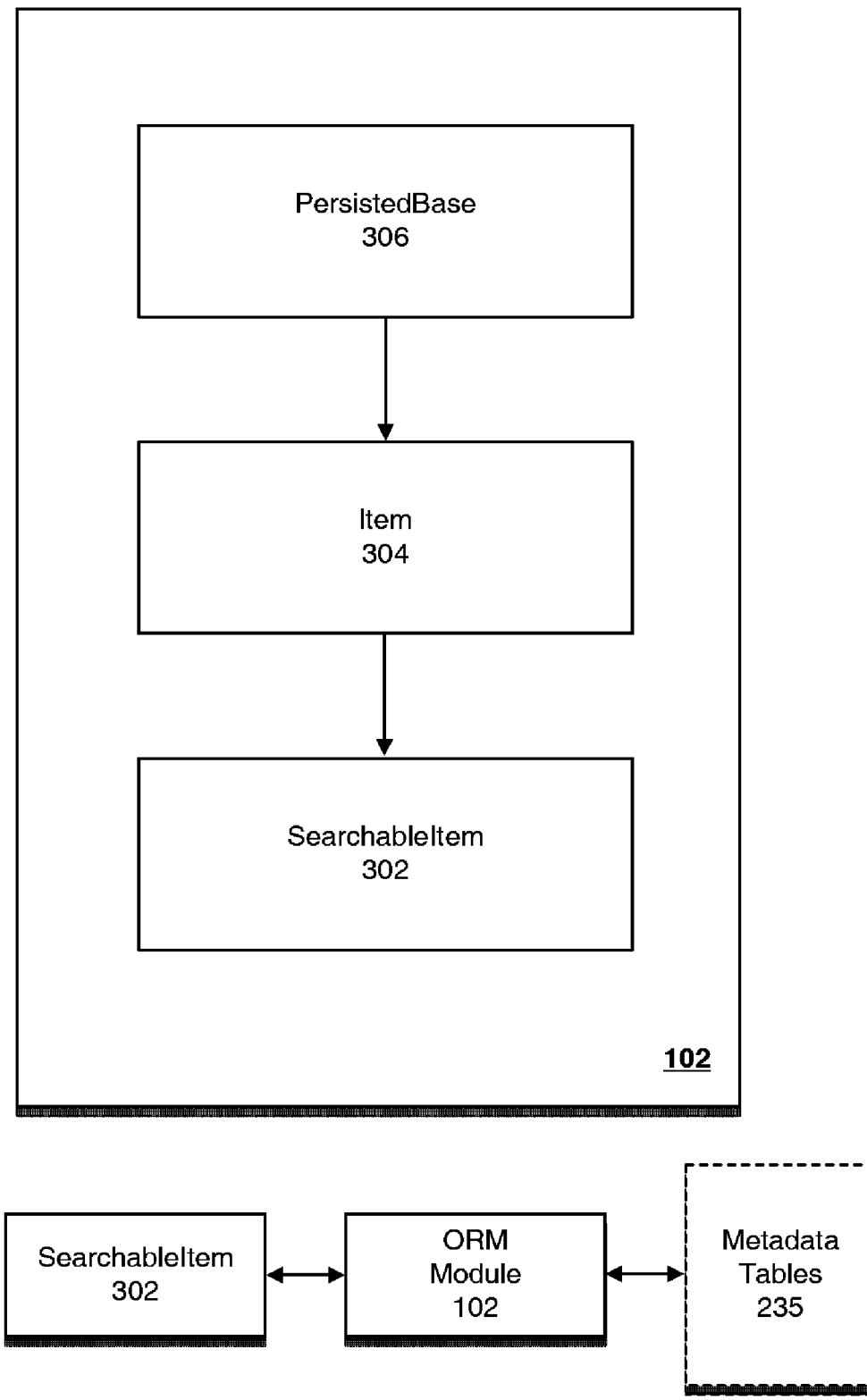
FIG. 3A shows a class hierarchy of an exemplary ORM ("Object Relational Mapping") layer according to one embodiment.

FIG. 3A shows a class hierarchy of an exemplary ORM layer according to one embodiment. According to one embodiment ORM layer 102 defines a static ORM object implemented in C# called SearchableItem 302 that inherits from a base class Item 304, which in turn inherits from a class called PersistedBase 306. SearchableItem object 302 as instantiated corresponds directly to searchable fields in a model 280 within a content schema 220.

As shown in FIG. 3A, ORM module 102 negotiates between SearchableItem object 302 and metadata tables 235. Typically users will interact with object such as SearchableItem 302 directly. However, the data comprising a SearchableItem object 302 is persisted in metadata tables 235, which may comprise a portion of a relational database. ORM module 102 performs functions for negotiating between an object representation such as SearchableItem 302 and an underlying relational database representation such as metadata tables 235. It should be understood that ORM layer may be implemented utilizing any programming language or representation.

The structure and function of the class hierarchy shown in FIG. 3A is now described. PersistedBase class 306 comprises logic to bind a parent object to a database table named after that object. According to one embodiment a custom installer creates tables when binaries built with PersistedBase objects 306 are installed. The installer may utilize managed code reflection capability to examine all objects in the binaries to build the SQL tables with foreign key relationships along with columns named after member data in the corresponding object definition.

According to one embodiment, base class Item 304 defines all data common to content stored on ECM 100 such as "created data", "creator XUID", "payload size", "popularity" and "average rating". According to one embodiment, item 304 utilizes the following definition:
Int Id
Int CustomerTitleId
Int ContentType
Ulong SubmitterXuid
DateTime SubmissionTime
Bool InvestigateFlag
Bool QualityFlag
Int PayloadSize
Bool IsPayloadUploaded
The ORM item definition may also define:
[DictionaryMember(KeyType=typeof(ulong),
ElementType=typeof(short))]
private FastDictionaryUnsorted m_ratings=new FastDictionaryUnsorted( );
These definitions provide a separate (sub) table in RDBMS 114 that allow each item to store a series of ratings based on a customer ID key:
Int Id
Int Id_Ratings
Key Ulong (submitter XUID)
Int Value (rating)
This item object allows for uploading and downloading of a payload (stored in a payload table) and further allowing updates of customers' opinion of that payload via its rating attribute. The payload table stores the actual data corresponding to a content element.

SearchableItem 302 may store metadata type fields, which are used to describe a title's content in detail and allows content objects to be queried in specific and varied ways. According to one embodiment SearchableItem 302 may store only a fixed number of five primitive types: ints, floats, ulongs, DateTime values and strings. Of course SearchableItem may store any number of primitive types and the five specific types noted are merely exemplary. SearchableItem 302 may also store a number of references into a SearchableitemBlob table that may store non-searchable blob data. Non-searchable blob data may include content preview information such as thumbnails, sounds or any other sort of custom data structure, data stream or proprietary content.

Figure 3B:
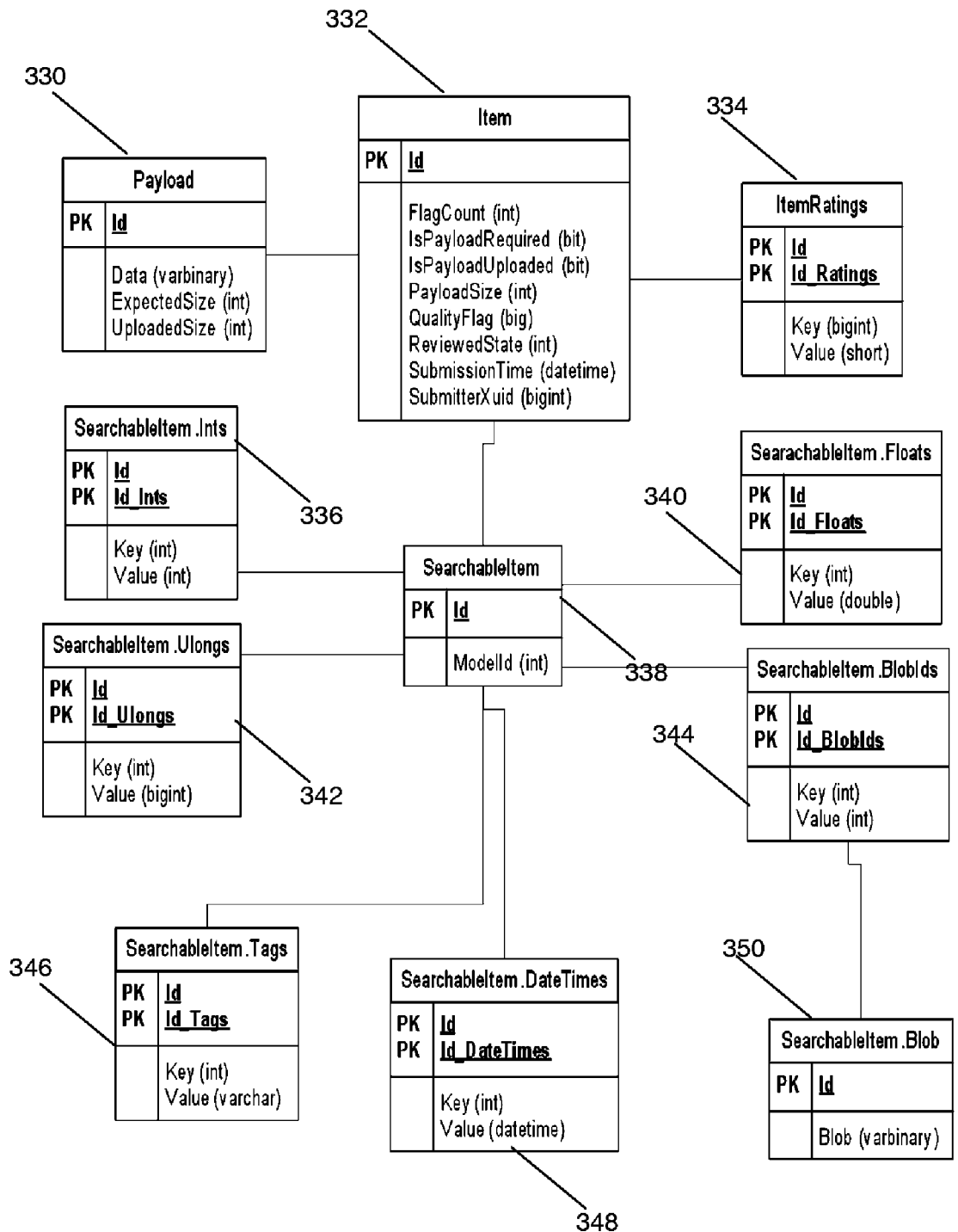
FIG. 3B shows a schema of metadata tables according to one embodiment.

FIG. 3B shows a schema of metadata tables according to one embodiment. The schema structure shown in FIG. 3B corresponds to metadata tables 235 shown in FIG. 2C. SearchableItem table 338 and item table 332 represent SearchableItem object 304 and Item object 332 as described above. Item table 332 is stores information associated with an Item as described above and is associated with Payload table 330, which stores information regarding an associated payload and ItemRatings table 334, which stores information relating to ratings of the item.

Item table 332 is also associated with SearchableItem table 338 because SearchableItem object 302 inherits from Item object 304. According to one embodiment, SearchableItem table 338 is associated with SearchableItem.Tags table 346 that stores primitive string types, SearchableItem.DateTimes table 348 that stores primitive date time types, SearchableItem.Ulongs table 342 that stores primitive Ulong types, SearchableItems.Ints table 336 that stores primitive integer values, SearchableItem.Floats table 340 that stores primitive floating point types and SearchableItem.Blob table 350 that stores blobs or references to blobs.

Item table 332 comprises a private key Id, FlagCount field, IsPayloadRequired field, IsPayloadUploaded field, PayloadSize field, QualityFlag field, ReviewedState filed, SubmissionTime field and SubmittedXuid field. Payload field comprises private key Id, Date field, ExpectedSize field and UploadedSize field. ItemRatings table comprises private key Id, private key Id_Ratings, Key field and Value field.

SearchableItem table 338 comprises a private key Id and ModeId field. SearchableItem.Ulongs table 342 comprises private key Id, private key Id_Ulongs, Key field and Value field. SearchableItem.Ints table 336 comprises private key Id, private key Id_Ints, Key field and Value field. SearchableItem.Tags field 346 comprises private key Id field, private key Id_Tags field, Key field and Value field. SearchableItem.DateTimes table 348 comprises private key Id, private Id_DateTimes, Key field and Value field. SearchableItem.Floats table 340 comprises private key Id, private key Id Floats, Key field and Value field. SearchableItem.BlobIds table 344 comprises private key Id, private key Id_BlobIds Key field and Value field. SearchableItem.Blob table 350 comprises private key Id and Blob field.

According to one embodiment, the five tables SearchableItem.Ints 336, SearchableItem.Ulongs 342, SearchableItem.Tags 346, SearchableItem.DateTimes 348, SearchableItem.Floats 340 are used in a star join pattern to create metadata for arbitrary content types as described below.

For example, a user might define their SearchableItem's metadata to have 2 integers, no floats, 3 bigints, 1 string and 2 DateTime values, and no blobs for example. In that event, a single record, when created, would contain 2 rows in the integer table, 0 rows in the float table, 3 rows in the bigint table, 1 row in the string table, and 2 rows in the DateTime table. This "type" of content has a variable amount of data spread out among 4 tables. Another SearchableItem defined by a user might contain 1 float and a single preview blob. In that event, even though the system has 6 tables available for use, that type of SearchableItem, when created, only uses 2 tables—a single entry in the float table and a single blob entry in the blob table—per SearchableItem record.

Figure 3C:
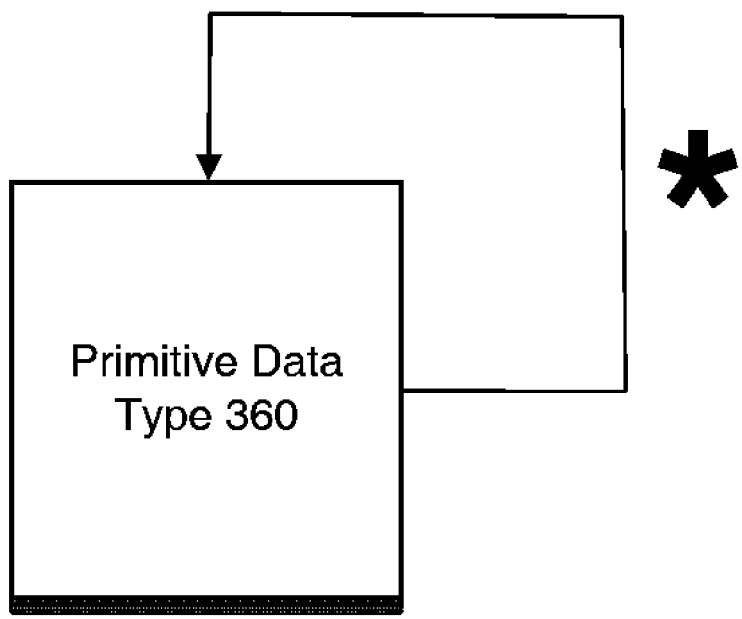
FIG. 3C depicts the use of a star join pattern.

According to one embodiment, RDBMS 114 utilizes a star join table design pattern for storing SearchableItem data 304. The star join pattern distributes a definition of a customer content type or model among a fixed number of thin "name/value" pair tables based on a primitive type, each with exactly one index. FIG. 3C depicts the use of a star join pattern. An arbitrary complex table may be built by repeated multiple joins of a set of primitive data types 360. For example, if a piece of searchable content contained 5 integers, those 5 integer values could be stored in the same table as 5 separate rows but with each having the same "owner id" that maps back to an ORM object that unifies those rows as a single record.

An advantage of the star join arrangement is that each record doesn't use tables or consume storage space that is not required. In addition, the star join provides a predictably efficient indexing model because each primitive table has exactly one index and every metadata property receives the same priority index. This fact should allow a database server to maximize cache efficiency, and maximize indexing efficiency, which should translate into very consistent query performance over time.

Figure 4A:
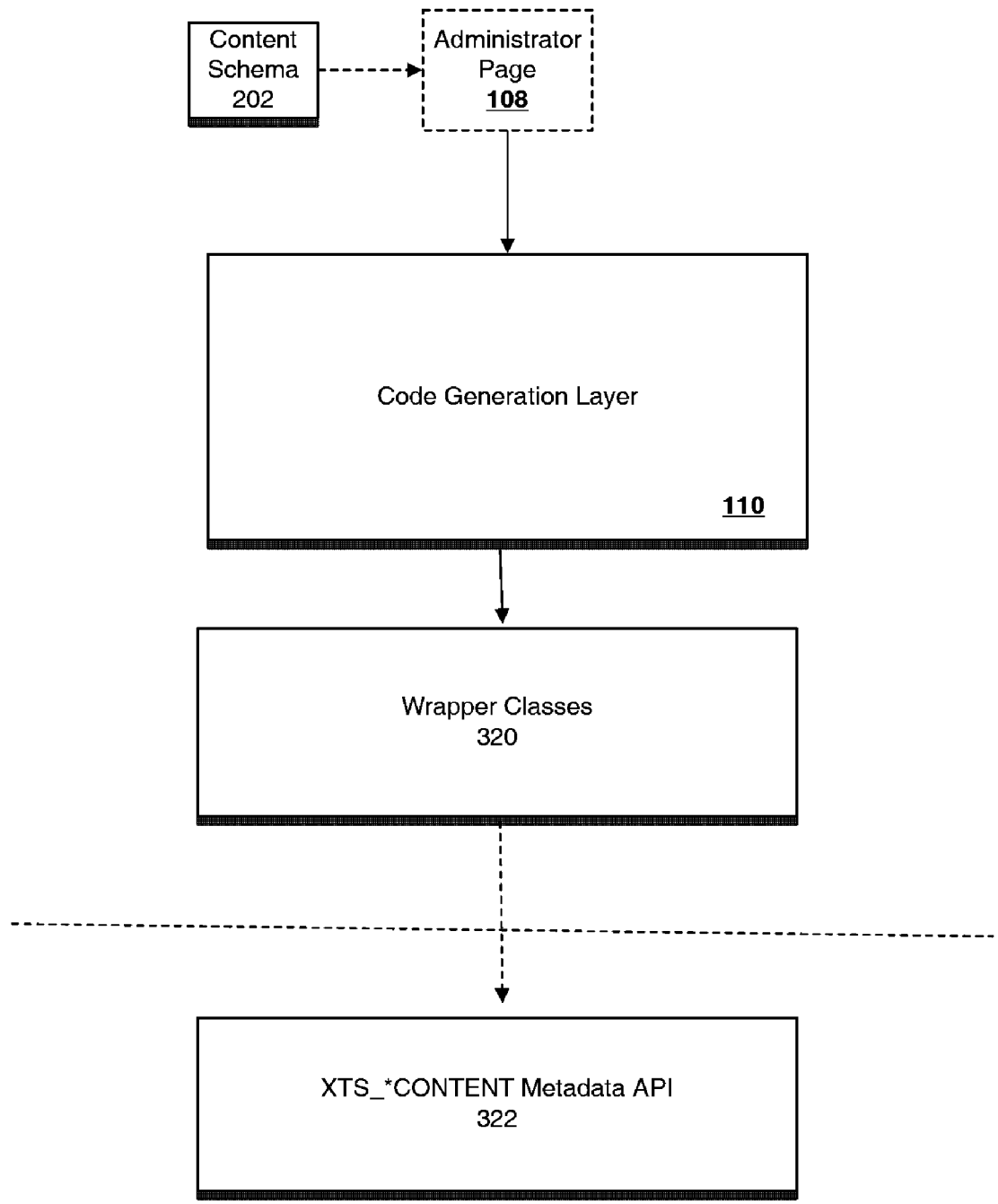
FIG. 4A illustrates an operation of a CodeGen layer according to one embodiment.

FIG. 4A illustrates an operation of a CodeGen layer according to one embodiment. CodeGen layer 110 receives a content schema 202 via administrator page 108 and generates custom data structures based upon the names and data types for that definition. In particular administrator page 108, upon receiving content schema 202, may call CodeGen layer 110, which attempts to generate header (.h) and body (.cpp) files for the game developer that may wrap calls to an underlying API such as XTS_ContentServer* as shown in FIG. 2c. If the code generation is successful .h and .cpp files corresponding to the generated code may be made available via the administrator page 108 for download. In general, content schema 202 comprises a well-defined and structured definition of one or more content elements for a title, query definitions on how to update and/or search for that content and an indication of what data is relevant and to returned for each query.

Figure 4B:
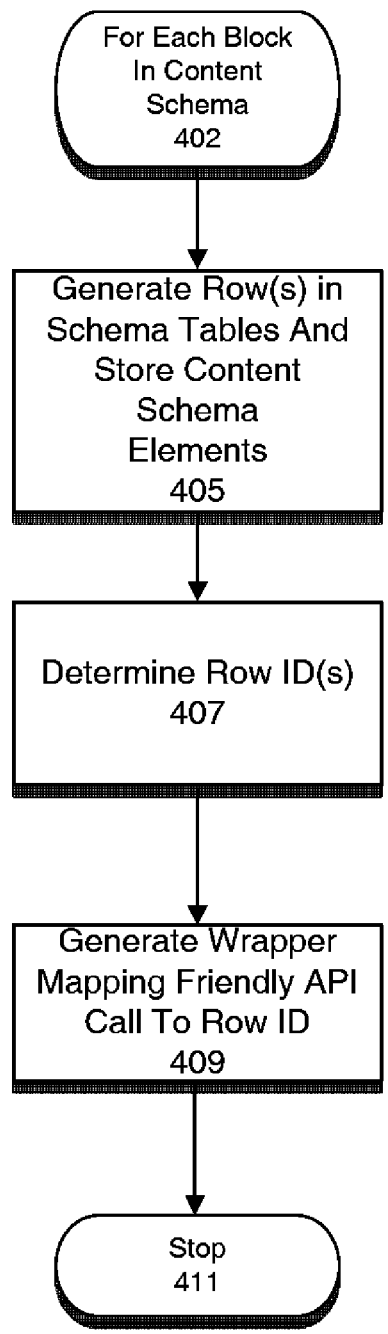
FIG. 4B is a flowchart illustrating a name resolution process for populating schema tables according to one embodiment.

Generated Wrapper APIs 320 also comprise logic for resolving calls to friendly APIs to actual underlying API calls, for example in XTS_ContentServer* as shown in FIG. 2c. In order to facilitate this functionality, upon uploading of content schema 202 via administrator page 112, schema tables 234 are populated based upon the received model definitions. According to one embodiment, the following schema tables 234 may be defined:

Schema.Field
Schema.Model
Schema.Model.Fields
Schema.Model.Updates
Schema.Query
Schema.Query.Parameters
Schema.Query.SelectFields
Schema.Query.SortList
Schema.QueryParameter
Schema.QuerySort
Schema.Update
Schema.Update.Fields
Schema.UserSchema
Schema.UserSchema.Models
Schema.UserSchema.Queries
Schema.UserSchemaManager FIG. 4B is a flowchart illustrating a name resolution process for populating schema tables and resolving a friendly API call 236 to a row in a schema table. This process may be performed by CodeGen layer in generating Wrapper API 320. As part of this process, Wrapper API 320 must comprise logic for mapping a friendly API call 236 to a particular row(s) in schema table 234, which comprise information relating to the logic described in uploaded content schema 220. The process is initiated in 402 and is performed for each block in content schema 220. In 405, row(s) in schema table 234 are generated for the block of content schema 220 being considered. In 407, row ID(s) relating to the block of content schema are generated. In 407 the row ID(s) in schema table 234 corresponding to the stored block are determined. In 409, Wrapper API 320 is generated and logic is inserted to map each friendly API call corresponding to the block to the row IDs determined in 407. The process ends in 411.

Populating schema tables 234 based upon a received content schema 220 allows any calls friendly APIs to create, search, get and update methods to be resolved. For example, if a user 120 were to upload a schema that includes a search query, a new row is automatically generated in the schema query table defining details for that query row such as a query name, schema version, corresponding model ID for content, etc. The row ID for the query information stored in the query table in RDBMS 114 then becomes a "query ID", which may be returned in generated wrapper code 320 as described in detail above.

As noted, a user may be provided access to the query stored in query table 114 via a "friendly" API achieved via the automatic generation of Wrapper API 320 rather than having to know the more cumbersome query ID or row ID for the query the user desires. For example, assuming the row ID were 14, for example, the generated Wrapper API 320 provides logic for mapping the from the API call to a query ID corresponding to row 14. This allows the query ID corresponding to row 14 be sent to static web methods in web application layer 104 based upon the wrapper and schema version automatically when a user makes the call the "friendly" API so that information on the query can be validated, the query created (using query arguments that are also provided to the static web methods) and executed against schema tables 234 RDBMS 114.

Thus, a developer may be afforded the opportunity to use a "friendly" looking API that is generated called "SearchForCars" and the body code inside that call provides a mapping between for the "SearchForCars" API call and a particular schema version to a particular query ID 14.

The following code segment shows how the schema shown above is processed by CodeGen layer 110 to generate wrapper code containing a Create and Update API as follows:

```
HRESULT XLS_CreateCar(
    int iInitiatingUser,
    int PayloadSize,
    int Color,
    int Price,
    LONGLONG SellerXuid,
    WCHAR* Make,
    WCHAR* Model,
    DWORD cbThumbnail,
    BYTE* Thumbnail,
    DWORD cbLogo,
    BYTE* Logo,
    DWORD cbSound,
    BYTE* Sound,
    int* id,
    XTS_TASK_HANDLE* pTask);
HRESULT XLS_UpdateColorAndPrice(
    int iInitiatingUser,
    int Id,
```

```
        int Color,
        int Price
        XTS_TASK_HANDLE* pTask);
HRESULT XLS_UpdateMyThumbNail(
        int iInitiatingUser,
        int Id,
        DWORD cbThumbnail,
        BYTE* Thumbnail,
        XTS_TASK_HANDLE* pTask);
```

A content schema may comprise one or more models 280 (1), which may further comprise one or more updates blocks 374. According to one embodiment, regardless of whether a user specifies any <update> blocks for any given model, an UpdateAll<ModelName> (update all) method is created, which is used to update an entire record.

Each model 280 may also comprise one or more queries blocks 376. However, query blocks are not required in a model depending upon the developer needs. A queries block 376 defines how a user intends to do searches against the content metadata. Queries will translate to client side Search APIs that the developer can call to execute those queries on the server.

For each query in the schema, all related developer-defined details about it are stored in schema tables 234 along with a schema version id and a QueryId. When called, the search web API method 314 (described below) constructs a dynamical SQL command from this stored information in schema tables 234 along with the arguments sent from the game such as search filter values and sort order values. Once validated and constructed, it executes the dynamic SQL command against the database, it generates C# arrays containing the data from each row in the result set back to the client wrapper 320. The client wrapper 320, which was generated by Code-Gen layer 110, pieces back all of those array values into an array of client side data structures and then hands back that array to the caller in an asynchronous manner.

From the game developers point of view, they call a easy to understand method like "SearchForCars" and eventually get back an array of client side data structures that contain all of the information they asked for in the query schema for that query. All of the details on how that call connects to the game servers, transmits the data, validates the query and arguments, builds the query, executes the query, returns the data, and reconstructs the data, is all abstracted from the game developer.

According to one embodiment, a query comprises 3 sections: <select>, <where> and <sort>. The <select> section determines what fields gets returned by this query. This can be a subset of the fields in the primary model, or all fields (specified by a wildcard, i.e. name="*"). The <where> section describes how to filter the data. And, the <sort> section describes how to sort the data. The following portion of a content schema illustrates a structure of a queries block 376.

```
<contentserver>
    ...
    <model name="Car">
        <fields>
            <field name="Color" type="int" />
            <field name="Price" type="int" />
            <field name="Make" type="string" />
            <field name="Model" type="string" />
            <field name="Thumbnail" type="blob" />
            <field name="Logo" type="blob" />
            <field name="Sound" type="blob" />
        </fields>
        <queries>
            <query name="SearchAll">
                <select>
                    <field name="*" />
                </select>
            </query>
            <query name="SearchForCarByColor">
                <select>
                    <field name="Color" />
                    <field name="Price" />
                    <field name="Make" />
                        <field name="Model" />
                    <field name="Thumbnail" />
                        <field name="Logo" />
                </select>
                <where>
                    <field op="eq" name="Color" />
                </where>
                <sort>
                    <field name="Price" order="asc"/>
                        <field name="Make" order="desc"/>
                </sort>
            </query>
        </queries>
    <select>
```

A user can specify the fields from the model to be returned in a query, as in the above query example, SearchForCarByColor, or they can specify to return all fields by specifying a wild card character like the "SearchAll" query does in the XML schema sample above.

For example, the <where> portion in the above example asks for all rows where "Color" equals a value specified in the generate wrapper API. The above query would generate a client data structure (called the "wrapper struct") and a Search API as follows:

```
struct SearchForCarByColor_Result
{
    int Color;
    int Price;
    WCHAR Make [MAX_TAGLENGTH + 1];
        WCHAR Model [MAX_TAGLENGTH + 1];
    UINT Thumbnail_Count;
    BYTE Thumbnail[102400];
    UINT Logo_Count;
    BYTE Logo[102400];
    UINT Sound_Count;
    BYTE Sound[102400];
};
HRESULT XLS_SearchForCarByColor(
    int iInitiatingUser,
    int ColorEqual,
    DWORD filterMask,
        bool isFilterPlayers,
        UINT filterPlayerCount,
        ULONGLONG* filterPlayers,
        int startAt,
        int maxResults,
        UINT* searchResults_Count,
        SearchForCarByColor_Result* searchResults,
        int* available,
    XTS_TASK_HANDLE* phTask);
```

As shown in the above example, a "ColorEqual" argument was generated according to both its name ("Color") and its operator ("eq" or "Equal"). The game developer could then call this method by passing in some value for "ColorEqual" and then setting the filterMask equal to an enum value (which may also be generated for the developer) that indicates to the search web method 314 method that the query must consider the ColorEqual argument when it constructs its dynamic SQL command on the server. According to one embodiment, a '0' value may be passed for the filterMask to this API and regardless if the ColorEqual argument is specified or not, it will not be considered by the dynamic SQL on the server, which will return a different query result. In this way, the same API can represent many different queries, simply by toggling different bit masks in the filterMask. This simplifies coding required for a developer, According to one embodiment, operators for each where clause may be specified: =, <, <=, >, >=, contains, like. The content schema 220 may specify a number of expected arguments, which will translate to how many inputs in the generated Search API.

The content schema 220 may also specify hardcoded constants such as:

```
<where>
    <field op="eq" name="Color" value="1"/>
</where>
```

In this case, the query argument is never supplied in the generated API, as it is always assumed to be this exact value.

According to one embodiment, a query may specify multiple query filers. This translates into <and> operators on the server, e.g. color='1' AND price>25000.

According to one embodiment, a user may specify up to 3 fields to sort the result with (in priority order). The sort fields can be either a user defined field from their model schema, or a base content field (SubmitterXuid, SubmissionTime, DownloadCount, AverageRating). In the above code schema example, the result will be sorted by Price ascending, and then by Make descending.

According to one embodiment, when a user uploads a content schema 220, the XML is parsed and any errors reported. If there are no errors, the schema is stored in schema tables 234 and associated with a schema version number. The generated APIs (in the generated .h and .cpp files) will have the appropriate schema version ids passed on automatically. The schema version ID may be used to segregate multiple clients on multiple versions, in the same database.

According to one embodiment, search results are returned as primitive type arrays rather than arrays of structures. For example, according to one embodiment search results are returned as:

```
[WebMethod]
public void Search(int queryId,
        SearchVariant[ ] searchParams,
    bool isFilterByPlayers,
        ulong[ ] filterPlayers,
        int startAt,
        int maxFieldIds,
            [BindArray(Max = "maxFieldIds")]
            out int[ ] rgFieldIds,
            int maxInts,
            [BindArray(Max = "maxInts")]
            out int[ ] rgInts,
            int maxFloats,
            [BindArray(Max = "maxFloats")]
            out float[ ] rgFloats,
            int maxUlongs,
            [BindArray(Max = "maxUlongs")]
            out ulong[ ] rgUlongs,
            int maxTags,
```

-continued

```
            [BindArray(Max = "maxTags")]
            out ContentSearchableItemTag[ ] rgTags,
            int maxDTs,
            [BindArray(Max = "maxDTs")]
            out DateTime[ ] rgDTs,
            int maxBlobs,
            [BindArray(Max = "maxBlobs")]
            out ContentSearchableItemBlobData[ ] rgBlobs,
            int maxResults,
            [BindArray(Max = "maxResults")]
            out BaseContentCommonData[ ] rgItemData,
            out int recordCount,
            out int available)
```

Thus, according to this embodiment every primitive type is returned in an array of its own type as opposed to returning a single of array of structures. This allows only desired data members of the struct to be returned allowing significant bandwidth savings.

Figure 4C:
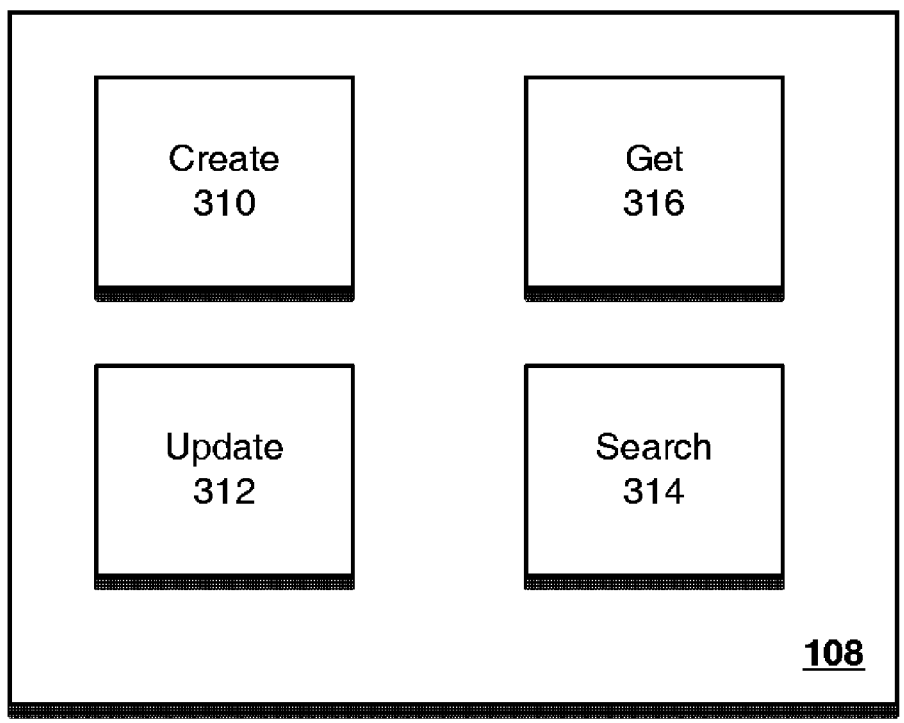
FIG. 4C depicts an exemplary structure of a web application layer.

FIG. 4C shows a structure of a web application layer according to one embodiment. Web application layer 108 may comprise create method 310, update method 312, search method 314 and get method 316. Create method 310 may enable a user of ECM 100 to upload digital content along with its associated metadata in a single call. Update method 312 may enable a user of ECM 100 to modify an existing record when its data changes back on the user's local device (i.e., client device). For example, if a content item were a person and the person ages, the age value stored on ECM 100 might be incremented.

Search method 314 enables a user of ECM 100 to query ECM for content based on specific search criteria and obtain an array of metadata records that match criteria in a single asynchronous download. According to one embodiment, each metadata record has a unique id that can be used to subsequently retrieve a payload via another asynchronous web method via a "DownloadPayload" web method. Get method 316 retrieves all the metadata not in the payload for a single content item that was initially created using the create method 310.

According to one embodiment, a get method 316 receives several primitive type arrays along with 3 (optional) preview blob byte arrays that any user can use to create an almost limitless number of searchable content types for a game.

According to one embodiment, create method 316 receives a modelId parameter that always must reference a model for the game that was created in the schema model table for that game during the content schema 220 upload stage on the game's administrator page 106. The generated wrapper code 320 will always send the correct modelId on behalf of the caller. The caller can therefore call their own wrapper methods like "XLS_CreateCar" and their modelId and metadata arguments will be preprocessed and transmitted correctly on the caller's behalf.

According to one embodiment, search API method 314 allows a user to provide complex questions about the data (queries) as well as provide flexible instructions on what data should be returned to the client. A "which fields should this query return" question is consolidated with a single argument, the "queryId". During the content schema 220 upload, <query> blocks' <select> tags, <where> tags, and <Sort> tags are created in rows in the schema tables 234 for each query. In particular, according to one embodiment all of the information for each query is added to the Schema.Query, Schema.Query.Parameters, Schema.Query.SelectFields, Schema.Query.SortList, Schema.Query.Parameter, and Schema.Query.Sort tables.

Each query may be assigned a "queryId" based on its primary key in the Schema.Query table, and that query id is returned to the user in their generated wrapper code. The wrapper code need only transmit a single argument (the query id) that the server can use to "look up" what fields it should return for that query.

According to one embodiment, an update method call 312 may be utilized to modify an existing object by updating any number of predetermined fields for its contented and/or one of the blobs that it contains in the SearchableItemBlob table for that object.

A user may invoke the update method 312 using a generated friendly API call such "UpdateCarColor" which ultimately will call update method 312 supplying it the content id of the car to update, the field id of the "Color" field (which among other things knows what data type the field is for that id) which in turn knows which array to get the updated value from (in this case, the rgInts array since the type of the "Color" field is "int").

According to one embodiment, the get method call 316 accepts a content id to retrieve and then return all of the metadata for that content item in the returned primitive type for example in an array.

According to one embodiment, each content schema uploaded is compared with a previous schema upload. All generated headers always contain a schema version stamp automatically. If any changes are detected, then the header file generated will reflect an increment in this schema version value. The schema versioning may be transparent to the user. According to one embodiment, the code that is generated for a title that wraps underlying web methods always send up the correct ids for each web method on behalf of the title. In this way, different versions of the title's schema in different builds can still work while acting on the same database. This feature allows rapid iteration over a feature or group of features for user-generated content because it doesn't slow an existing development or test effort down while changes to past schemas are made and tested. According to one embodiments a Schema ID is provided in generated source code. According to alternative embodiments, the Schema ID is not required as the ids for model, query, parameter, update, etc. are unique in and amongst themselves to perform name resolution.

FIG. 5 shows an exemplary computing environment in which aspects of the example embodiments may be implemented. Computing system environment 500 is only one example of a suitable computing environment and is not intended to suggest any limitation as to the scope of use or functionality of the described example embodiments. Neither should computing environment 500 be interpreted as having any dependency or requirement relating to any one or combination of components illustrated in exemplary computing environment 500.

The example embodiments are operational with numerous other general purpose or special purpose computing system environments or configurations. Examples of well known computing systems, environments, and/or configurations that may be suitable for use with the example embodiments include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The example embodiments may be described in the general context of computer-executable instructions, such as program modules, being executed by a computer. Generally, program modules include routines, programs, objects, components, data structures, etc. that perform particular tasks or implement particular abstract data types. The example embodiments also may be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the example embodiments includes a general purpose computing device in the form of a computer 510. Components of computer 510 may include, but are not limited to, a processing unit 520, a system memory 530, and a system bus 521 that couples various system components including the system memory to processing unit 520. Processing unit 520 may represent multiple logical processing units such as those supported on a multi-threaded processor. System bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). System bus 521 may also be implemented as a point-to-point connection, switching fabric, or the like, among the communicating devices.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

Computer 510 may also include other removable/non-removable, volatile/nonvolatile computer storage media. By way of example only, FIG. 6 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 541 is typically connected to system bus 521 through a non-removable memory interface such as interface 540, and magnetic disk drive 551 and optical disk drive 555 are typically connected to system bus 521 by a removable memory interface, such as interface 550.

The drives and their associated computer storage media discussed above and illustrated in FIG. 5, provide storage of computer readable instructions, data structures, program modules and other data for computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to processing unit 520 through a user input interface 560 that is coupled to the system bus, but may be connected by other interface and bus structures, such as a parallel port, game port or a universal serial bus (USB). A monitor 591 or other type of display device is also connected to system bus 521 via an interface, such as a video interface 590. In addition to the monitor, computers may also include other peripheral output devices such as speakers 597 and printer 596, which may be connected through an output peripheral interface 595.

Computer 510 may operate in a networked environment using logical connections to one or more remote computers, such as a remote computer 580. Remote computer 580 may be a personal computer, a server, a router, a network PC, a peer device or other common network node, and typically includes many or all of the elements described above relative to computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, computer 510 is connected to LAN 571 through a network interface or adapter 570. When used in a WAN networking environment, computer 510 typically includes a modem 572 or other means for establishing communications over WAN 573, such as the Internet. Modem 572, which may be internal or external, may be connected to system bus 521 via user input interface 560, or other appropriate mechanism. In a networked environment, program modules depicted relative to computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Computing environment 500 typically includes at least some form of computer readable media. Computer readable media can be any available media that can be accessed by computing environment 500. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 500. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

What is claimed:

1. A method for creating, updating, searching and retrieving media content comprising:

receiving a content schema corresponding to a content element;

using the content schema, generating respective custom interfaces and associated code blocks for creating metadata associated with the content element, updating the metadata associated with the content element, retrieving the metadata associated with the content element and searching for the content element via the metadata associated with the content element;

providing the custom interfaces and associated code blocks to at least one user; and upon receiving via an API ("Application Programming Interface") a method call via one of the custom interfaces, creating a representation of the content element, updating the metadata associated with the content element, searching for the content element using a received query, or retrieving the content element, the creating a representation of the content element comprising:

receiving payload data and the metadata associated with the content element and responsively:

storing the payload data in a table in a relational database; and storing the associated metadata in a relational database.

2. The method of claim 1, wherein the content schema is coded in XML ("Extensible Markup Language") and wherein the content schema defines at least one model, each model defining at least one field, the at least one field configurable to store a metadata element for the content element, at least one first information for updating the model and at least one second information for performing a search with respect to the model storing the at least one field, the first information and the second information in at least one table in a relational database.

3. The method of claim 2, wherein each field comprises a primitive type.

4. The method of claim 3, wherein each primitive type is one of an integer data value, floating point data value, unsigned long data value, string data value and a datetime data value.

5. The method of claim 1, wherein each of the custom interfaces comprises method calls utilizing a custom name for an associated model.

6. The method of claim 2, wherein each of the at least one field further comprises a blob field for storing preview data.

7. A computer readable storage medium comprising instructions for creating, updating, searching and retrieving media content, the instructions comprising:

receiving a content schema corresponding to a content element;

using the content schema, generating respective custom interfaces and associated code blocks for creating metadata associated with the content element, updating the metadata associated with the content element, retrieving the metadata associated with the content element and searching for the content element via the metadata associated with the content element;

providing the custom interfaces and associated code blocks to at least one user; and upon receiving via an API ("Application Programming Interface") a method call via one of the custom interfaces, creating a representation of the content element, updating metadata the associated with the content element, searching for the content element using a received query, or retrieving the content element, the creating a representation of the content element comprising:

receiving payload data and the metadata associated with the content element and responsively:

storing the payload data in a table in a relational database; and storing the associated metadata in a relational database.

8. The computer readable storage medium of claim 7, wherein the content schema is coded in XML and wherein the content schema defines at least one model, each model defining at least one field, the at least one field configurable to store a metadata element for the content element, at least one first information for updating the model and at least one second information for performing a search with respect to the model storing the at least one field, the first information and the second information in at least one table in a relational database.

9. The computer readable storage medium of claim 7, wherein each field comprises a primitive type.

10. The computer readable storage medium of claim 9, wherein each primitive type is one of an integer data value, floating point data value, unsigned long data value, string data value and a datetime data value.

11. The computer readable storage medium of claim 7, wherein each of the custom interfaces comprises method calls utilizing a custom name for an associated model.

12. The computer readable storage medium of claim 7, wherein each of the at least one field further comprises a blob field for storing preview data.

13. A system for creating, updating, searching and retrieving media content comprising:

a processor, wherein the processor is adapted to:

for a content element, receiving a content schema, wherein the content schema defines at least one model, each model defining at least one field, the at least one field configurable to store a metadata element for the content element, at least one first information for updating the model and at least one second information for performing a search with respect to the model;

storing the at least one field, the first information and the second information in at least one table in a relational database;

using the content schema, generating a first custom interface and associated code block for creating metadata associated with the content element, a second custom interface and associated code block for updating the metadata associated with the content element, a third interface and associated code block for retrieving the metadata associated with the content element and a fourth interface and associated code block for searching for the content element via the metadata associated with the content element;

providing the custom interfaces and associated code blocks to at least one user;

upon receiving via an API ("Application Programming Interface") a method call via one of the custom interfaces, creating a representation of the content element, updating the metadata associated with the content element, searching for the content element using a received query, or retrieving the content element, the creating a representation of the content element comprising:
    receiving payload data and the metadata associated with the content element and responsively:
        storing the payload data in a table in a relational database; and
        storing the associated metadata in a relational database.

14. The system of claim 13, wherein the content schema is coded in XML.

15. The system of claim 13, wherein each field comprises a primitive type.

16. The system of claim 15, wherein each primitive type is one of an integer data value, floating point data value, unsigned long data value, string data value and a datetime data value.

17. The system of claim 13, wherein the content element is associated with a versioning identifier.

* * * * *